US00RE40302E

(19) United States
(12) Reissued Patent
Nishiura et al.

(10) Patent Number: US RE40,302 E
(45) Date of Reissued Patent: May 6, 2008

(54) POLYELECTROLYTE, NON-AQUEOUS ELECTROLYTE, AND ELECTRICAL DEVICE CONTAINING THE SAME

(75) Inventors: Masahito Nishiura, Kyoto (JP); Michiyuki Kono, Osaka (JP); Masayoshi Watanabe, Kanagawa (JP)

(73) Assignee: Dai-Ichi Kogyo Seiyaku Co. Ltd., Kyoto (JP)

(21) Appl. No.: 11/327,829

(22) PCT Filed: Aug. 28, 2000

(86) PCT No.: PCT/JP00/05812

§ 371 (c)(1),
(2), (4) Date: Apr. 25, 2001

(87) PCT Pub. No.: WO01/18898

PCT Pub. Date: Mar. 15, 2001

Related U.S. Patent Documents

Reissue of:
(64) Patent No.: 6,673,495
Issued: Jan. 6, 2004
Appl. No.: 09/787,231
Filed: Apr. 25, 2001

(30) Foreign Application Priority Data

Sep. 2, 1999 (JP) ..... 11-248890
Sep. 2, 1999 (JP) ..... 11-248891

(51) Int. Cl.
*H01M 6/18* (2006.01)

(52) U.S. Cl. ..... 429/306; 429/313; 429/314; 429/316; 429/317; 429/321; 429/323; 429/322; 429/337; 429/341; 429/326; 429/231.95; 429/231.1; 429/309; 361/523

(58) Field of Classification Search ..... 429/306, 429/313, 314, 316, 317, 321, 323, 322, 337, 429/341, 326, 309, 231.95, 231.1; 361/523
See application file for complete search history.

(56) References Cited

FOREIGN PATENT DOCUMENTS

| | | | |
|---|---|---|---|
| EP | 0 986 122 | * | 3/2000 |
| JP | 60-165050 | * | 8/1985 |
| JP | 10-223258 | | 8/1998 |
| JP | 11-003728 | | 1/1999 |
| JP | 11-054151 | | 2/1999 |
| JP | 11-134937 | * | 5/1999 |
| JP | 11-219730 | | 8/1999 |
| JP | 2000-90731 | * | 3/2000 |
| JP | 2000-173343 | * | 6/2000 |
| WO | WO-97/16862 | | 5/1997 |

* cited by examiner

*Primary Examiner*—Laura Weiner

(74) *Attorney, Agent, or Firm*—Jordan and Hamburg LLP

(57) ABSTRACT

Provided are a polymeric electrolyte or a nonaqueous electrolyte that can improve a transport rate of charge carrier ions by adding a compound having boron atoms in the structure, preferably one or more selected from the group consisting of compounds represented by the following general formulas (1) to (4), and an electric device such as a cell or the like using the same.

general formula (1)

general formula (2)

general formula (3)

general formula (4)

wherein $R^{11}$, $R^{12}$, $R^{13}$, $R^{14}$, $R^{15}$, $R^{16}$, $R^{21}$, $R^{22}$, $R^{23}$, $R^{24}$, $R^{25}$, $R^{26}$, $R^{27}$, $R^{28}$, $R^{31}$, $R^{32}$, $R^{33}$, $R^{34}$, $R^{35}$, $R^{36}$, $R^{37}$, $R^{38}$, $R^{39}$, $R^{310}$, $R^{41}$, $R^{42}$, $R^{43}$, $R^{44}$, $R^{45}$, $R^{46}$, $R^{47}$, $R^{48}$, $R^{49}$, $R^{410}$, $R^{411}$ and $R^{412}$ each represent a hydrogen atom, a halogen atom or a monovalent group, or represent groups bound to each other to form a ring, and Ra, Rb, Rc and Rd each represent a group having a site capable of being bound to boron atoms which are the same or different.

14 Claims, No Drawings

POLYELECTROLYTE, NON-AQUEOUS ELECTROLYTE, AND ELECTRICAL DEVICE CONTAINING THE SAME

Matter enclosed in heavy brackets [ ] appears in the original patent but forms no part of this reissue specification; matter printed in italics indicates the additions made by reissue.

TECHNICAL FIELD

The present invention relates to a polymeric electrolyte and a nonaqueous electrolyte which can improve a transport rate of charge carrier ions upon using a compound having boron atoms in the structure as an additive, and an electric device using the same.

BACKGROUND OF THE INVENTION

According to the development of cells having a high voltage and a high capacity, a large number of various polymeric electrolytes and nonaqueous electrolytes have been proposed. However, polymeric electrolytes and nonaqueous electrolytes have an ionic conductivity which is lower than that of aqueous electrolytes by more than one figure. Further, for example, a polymeric electrolyte using polyethylene glycol has defects that it is low in transfer and transport rates of charge carrier ions. Thus, attempts of improvement have been made by using various methods.

Meanwhile, when nonaqueous electrolytes are applied to cells, they are problematic in that charge/discharge efficiency and cycle characteristics are low. Therefore, in order to improve these, a solvent composition of an electrolytic solution and a type of a support salt has been studied, and a system in which an additive is added to a nonaqueous electrolyte has been studied. For example, Japanese Patent Laid-Open No. 3,728/1999 discloses a nonaqueous electrolytic solution secondary cell comprising a positive electrode and a negative electrode containing a material capable of occluding and releasing lithium reversibly, a nonaqueous electrolytic solution containing a lithium salt and a separator, at least one organic boron compound being contained in the cell in a predetermined amount.

However, these prior techniques have posed a problem that an effective concentration region of an additive is narrow and further an effect provided by its addition per weight is small.

In view of the foregoing, the invention has been made, and aims to provide a polymeric electrolyte and a nonaqueous electrolyte which increases a dissociation degree of an electrolytic salt, which can improve a transport rate of charge carrier ions and in which an effective concentration region of an additive is wide and an effect provided by its addition per weight is great, and an electric device using the same.

DISCLOSURE OF THE INVENTION

The present inventors have assiduously conducted investigations to solve the problems. They have consequently conceived that counter ions of charge carrier ions are trapped and less moved to control a transport rate of charge carrier ions, and have found that the use of a compound containing plural trivalent boron atoms in the structure, a Lewis acid, as an additive, is effective for solving the problems. This finding has led to the completion of the invention.

That is, the polymeric electrolyte of the invention is a polymeric electrolyte made of an electrolyte salt and a polymeric compound forming a complex with the electrolytic salt, the polymeric electrolyte containing one or more compounds having boron atoms in the structure.

Further, the nonaqueous electrolyte of the invention is a nonaqueous electrolyte made of an electrolytic salt and a nonaqueous solvent that dissolves the electrolytic salt, the nonaqueous electrolyte containing one or more compounds having boron atoms in the structure.

The compound having boron atoms in the structure is preferably selected from the group consisting of compounds represented by the following general formulas (1) to (4).

general formula (1)

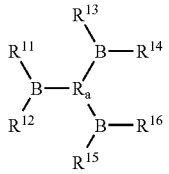

general formula (2)

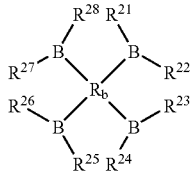

general formula (3)

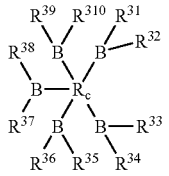

general formula (4)

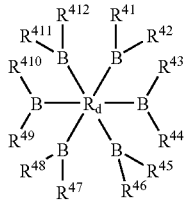

$R^{11}$, $R^{12}$, $R^{13}$, $R^{14}$, $R^{15}$ and $R^{16}$ formula (1), $R^{21}$, $R^{22}$, $R^{23}$, $R^{24}$, $R^{25}$, $R^{26}$, $R^{27}$ and $R^{28}$ in formula (2), $R^{31}$, $R^{32}$, $R^{33}$, $R^{34}$, $R^{35}$, $R^{36}$, $R^{37}$, $R^{38}$, $R^{39}$ and $R^{310}$ in formula (3), and $R^{41}$, $R^{42}$, $R^{43}$, $R^{44}$, $R^{45}$, $R^{46}$, $R^{47}$, $R^{48}$, $R^{49}$, $R^{410}$, $R^{411}$ and $R^{412}$ in formula (4), which may be the same or different, each represent a hydrogen atom, a halogen atom or a monovalent group, or are bound to each other to form a ring.

Ra in formula (1) represents a group having a site capable of being bound to at least 3 boron atoms which are the same or different, Rb in formula (2) represents a group having a site capable of being bound to at least 4 boron atoms which are the same or different, Rc in formula (3) represents a group having a site capable of being bound to at least 5 boron atoms which are the same or different, and Rd in formula (4) represents a group having a site capable of being bound to at least 6 boron atoms which are the same or different.

The polymeric compound used in the polymeric electrolyte of the invention includes, for example, a polyalkylene, a polyether, a polyester, a polyamine, a polyimide, a polyurethane, a polysulfide, a polyphosphazene, a polysiloxane, derivatives thereof, copolymers thereof and crosslinked products thereof. Alternatively, it includes a polyalkylene oxide, polyvinylidene fluoride, polyhexafluoropropylene, polyacrylonitrile, polymethyl methacrylate, derivatives thereof, copolymers thereof and crosslinked products thereof.

As the electrolytic salt, a lithium salt is preferably used. Further, as the nonaqueous solvent, an aprotic solvent is preferably used.

The electric device of the invention is manufactured using any of the polymeric electrolytes and the nonaqueous electrolytes. For example, when the electric device is a cell, it is obtained by linking a positive electrode and a negative electrode through any of the polymeric electrolytes or through any of the nonaqueous electrolytes and a separator.

BEST MODE FOR CARRYING OUT THE INVENTION

Preferable embodiments of the invention are described below. However, the invention is not limited thereto.

1. Compound Having Boron Atoms

With respect to the compound having boron atoms in the structure, which is added to a polymeric electrolyte or a nonaqueous electrolyte of the invention, the compounds represented by general formulas (1) to (4) are preferably used as described earlier.

general formula (1)

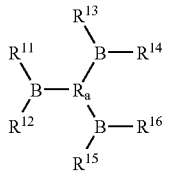

general formula (2)

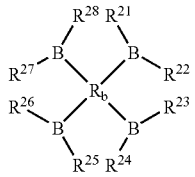

general formula (3)

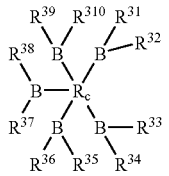

general formula (4)

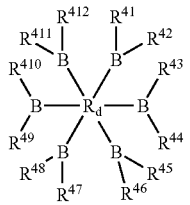

$R^{11}$, $R^{12}$, $R^{13}$, $R^{14}$, $R^{15}$ and $R^{16}$ in formula (1), $R^{21}$, $R^{22}$, $R^{23}$, $R^{24}$, $R^{25}$, $R^{26}$, $R^{27}$ and $R^{28}$ in formula (2), $R^{31}$, $R^{32}$, $R^{33}$, $R^{34}$, $R^{35}$, $R^{36}$, $R^{37}$, $R^{38}$, $R^{39}$ and $R^{310}$ in formula (3), and $R^{41}$, $R^{42}$, $R^{43}$, $R^{44}$, $R^{45}$, $R^{46}$, $R^{47}$, $R^{48}$, $R^{49}$, $R^{410}$, $R^{411}$ and $R^{412}$ in formula (4), which may be the same or different, each represent a hydrogen atom, a halogen atom or a monovalent group.

Examples of the monovalent group include an alkyl group, an alkoxy group, an aryl group, an alkenyl group, an alkinyl group, an aralkyl group, a cycloalkyl group, a cyano group, a hydroxyl group, a formyl group, an aryloxy group, an alkylthio group, an arylthio group, an acyloxy group, a sulfonyloxy group, an amino group, an alkylamino group, an arylamino group, a carboxyamino group, an oxysulfonylamino group, a sulfonamido group, an oxycarbonylamino group, a ureido group, an acyl group, an oxycarbonyl group, a carbamoyl group, a sulfonyl group, a sulfinyl group, an oxysulfonyl group, a sulfamoyl group, carboxylic group, a sulfonic group, a phosphonic group, a heterocyclic group, —$B(R^1)(R^2)$, —$OB(R^1)(R^2)$ and —$OSi(R^1)(R^2)(R^3)$. Of these, an alkyl group, an aryl group and fluorine-substituted derivatives thereof are preferable. $R^1$, $R^2$ and $R^3$herein each represent a hydrogen atom, a halogen atom or a monovalent group. Examples of the monovalent group include an alkyl group, an alkoxy group, an aryl group, an alkenyl group, an alkinyl group, an aralkyl group, a cycloalkyl group, a cyano group, a hydroxyl group, a formyl group, an aryloxy group, an alkylthio group, an arylthio group, an acyloxy group, a sulfonyloxy group, an amino group, an alkylamino group, an arylamino group, a carboxyamino group, an oxysulfonylamino group, a sulfonamide group, an oxycarbonylamino group, a ureido group, an acyl group, an oxycarbonyl group, a carbamoyl group, a sulfonyl group, a sulfinyl group, an oxysulfonyl group, a sulfamoyl group, a carboxylic group, a sulfonic group, a phosphonic group, a heterocyclic group and derivatives thereof.

Further, $R^{11}$, $R^{12}$, $R^{13}$, $R^{14}$, $R^{15}$ and $R^{16}$ in formula (1), $R^{21}$, $R^{22}$, $R^{23}$, $R^{24}$, $R^{25}$, $R^{26}$, $R^{27}$ and $R^{28}$ in formula (2), $R^{31}$, $R^{32}$, $R^{33}$, $R^{34}$, $R^{35}$, $R^{36}$, $R^{37}$, $R^{38}$ and $R^{310}$ in formula (3), and $R^{41}$, $R^{42}$, $R^{43}$, $R^{44}$, $R^{45}$, $R^{46}$, $R^{47}$, $R^{48}$, $R^{49}$, $R^{410}$, $R^{411}$ and $R^{412}$ in formula (4) may be bound to each other to form a ring, and this ring may have a substituent. Moreover, each group may be substituted with a group which can be substituted.

Examples of the group having a site capable of being bound to at least 3 boron atoms which are the same or different, as represented by Ra, in formula (1) include residues such as glycerin, trimethylolethane, trihydroxybenzene, dihydroxybenzoic acid, diaminobenzoic acid, tribromobenzene and the like.

Examples of the group having a site capable of being bound to at least 4 boron atoms which are the same or different, as represented by Rb, in formula (2) include residues such as diglycerin, pentaerythritol, tetrabromobenzene and the like.

Examples of the group having a site capable of being bound to at least 5 boron atoms which are the same or different, as represented by Rc, in formula (3) include residues such as glucose, morin and the like.

Examples of the group having a site capable of being bound to at least 6 boron atoms which are the same or different, as represented by Rd, in formula (4) include residues such as galactaric acid, myricetin and the like.

The compounds represented by the foregoing general formulas (1) to (4) may be used either singly or in combination.

Specific examples of the compounds represented by general formulas (1) to (4) are as follows.

3Z-1
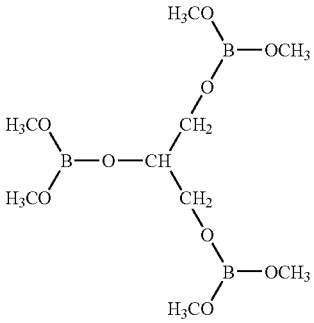
3Z-2
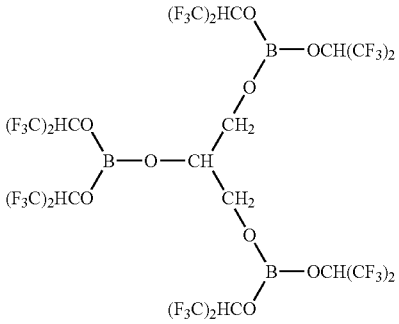
3Z-3
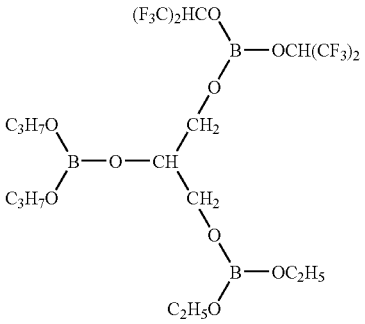
3Z-4
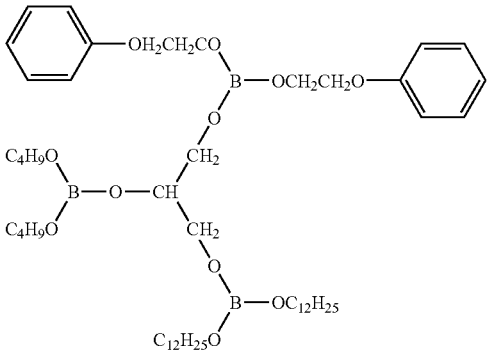
-continued
3Z-5
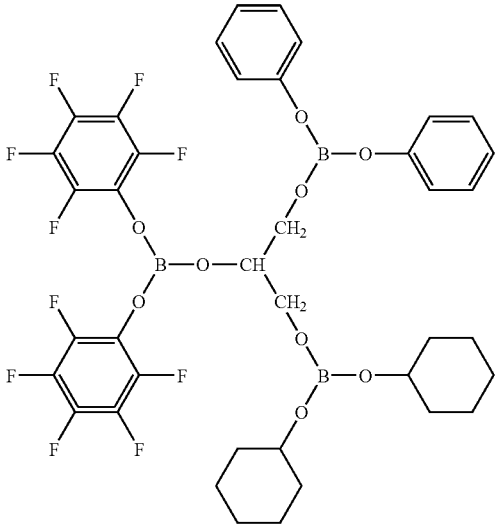
3Z-6
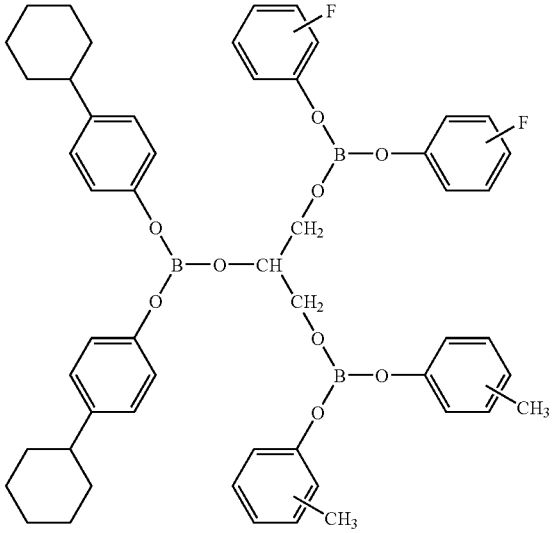
3Z-7
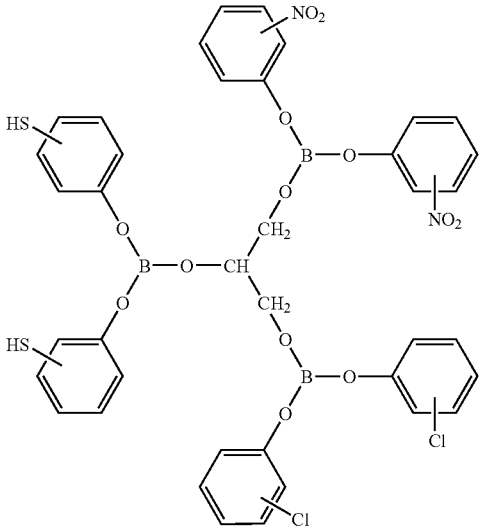

-continued
3Z-8
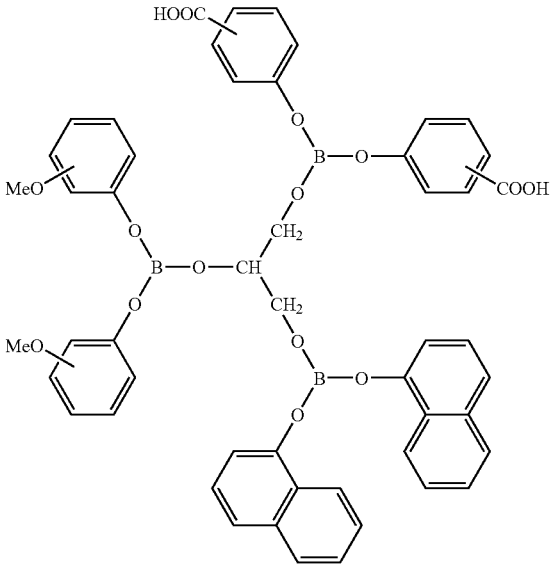
3Z-9
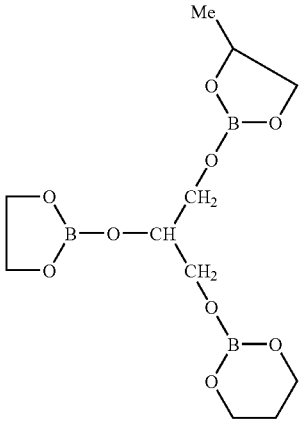
3Z-10
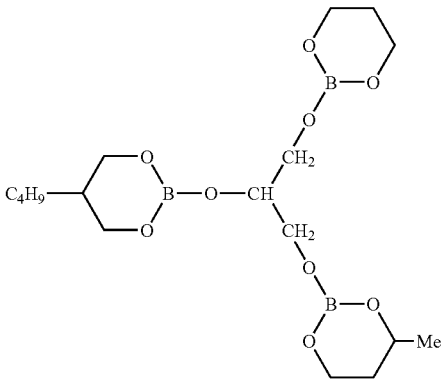
-continued
3Z-11
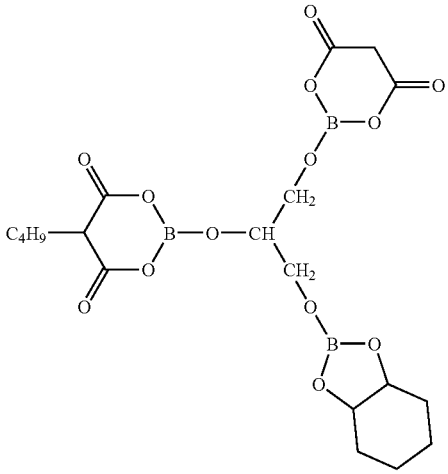
3Z-12
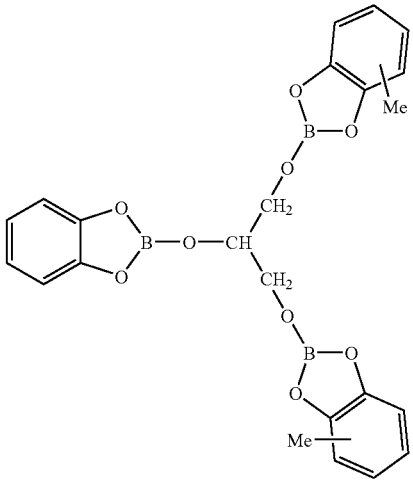
3Z-13
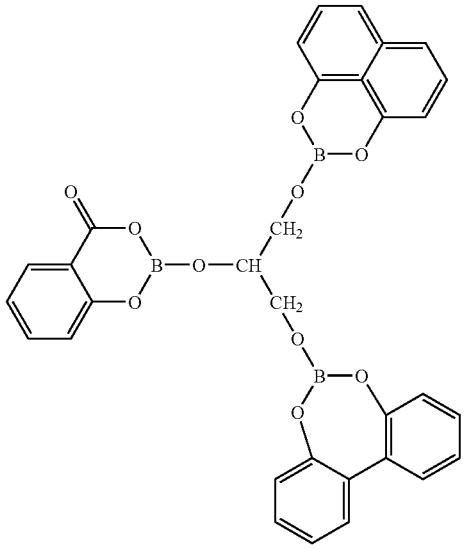

-continued
3Z-14
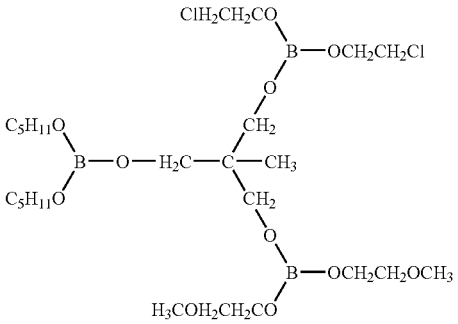
3Z-15
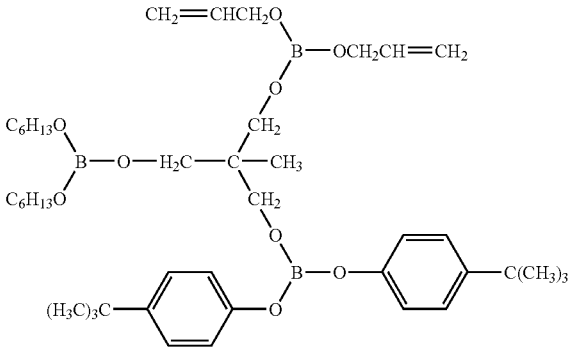
3Z-16
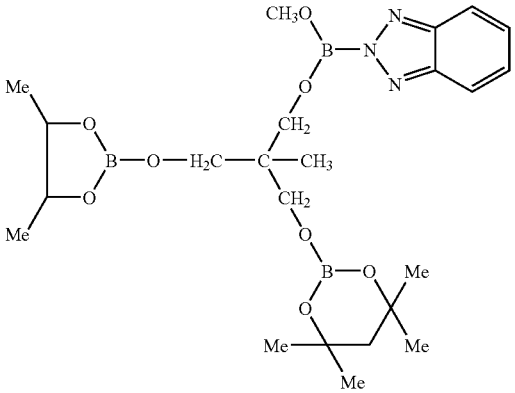
3Z-17
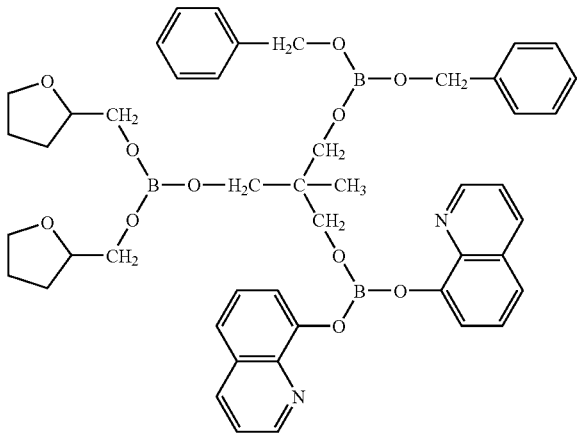
-continued
3Z-18
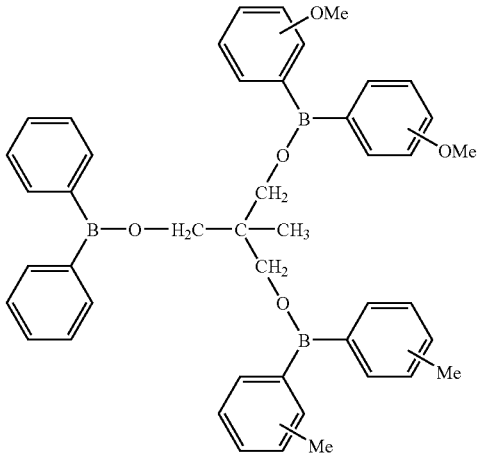
3Z-19
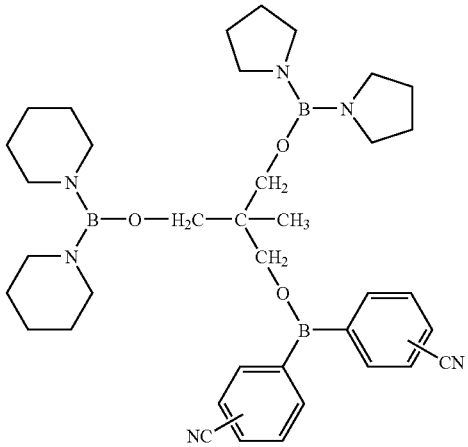
3Z-20
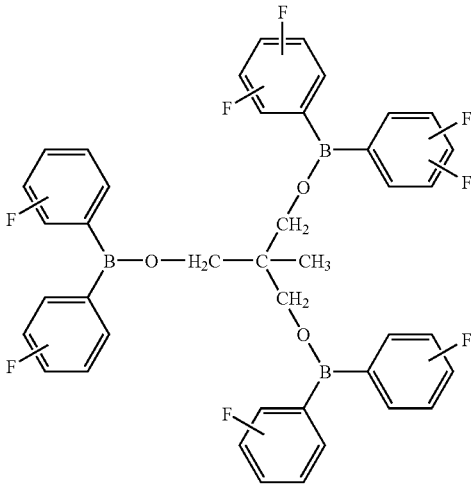

-continued
3Z-21
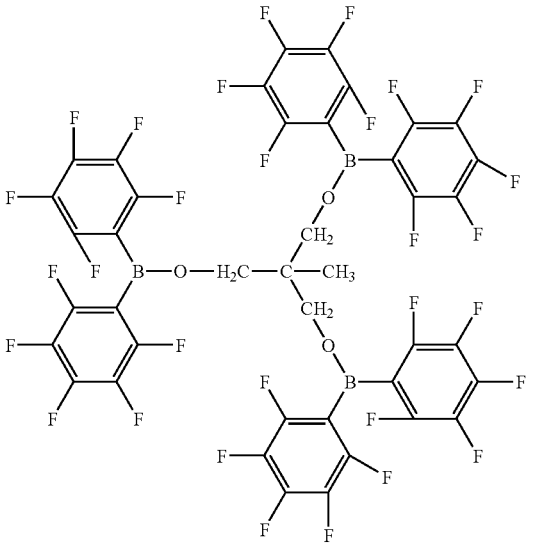
3Z-22
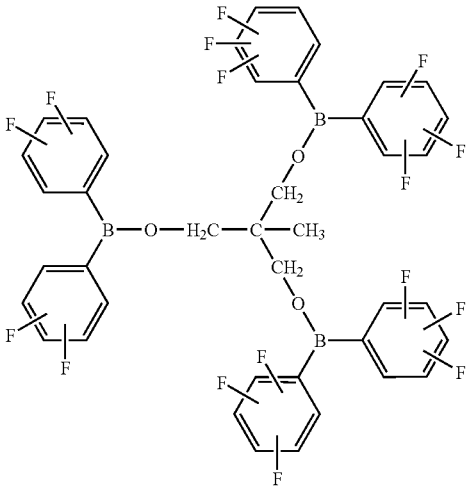
3Z-23
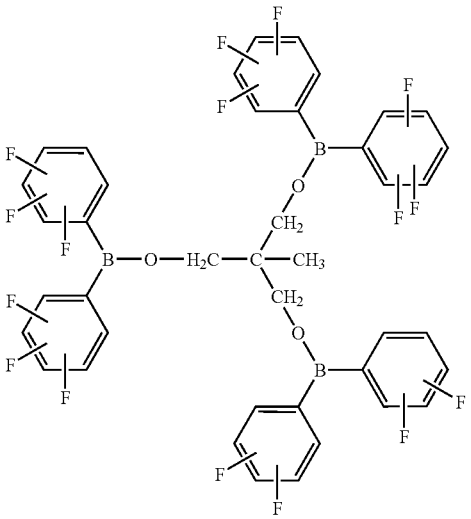
-continued
3Z-24
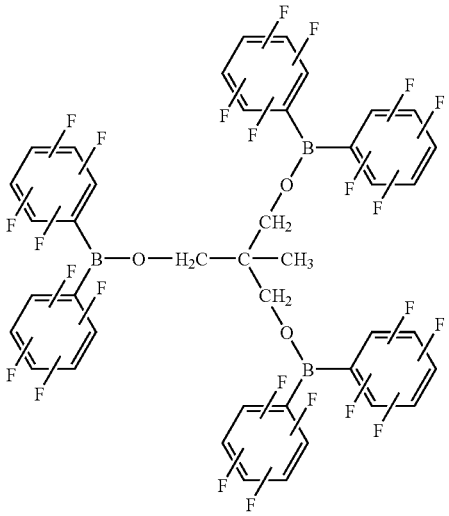
3Z-25
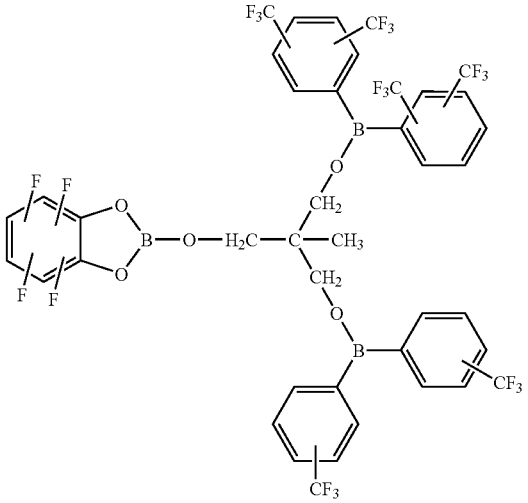
3Z-26
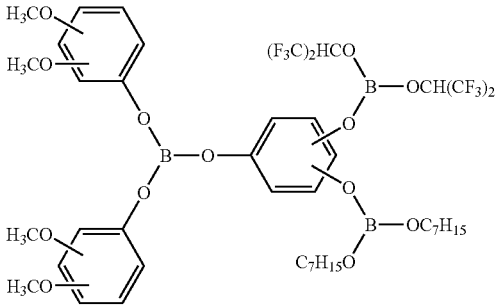

-continued
3Z-27
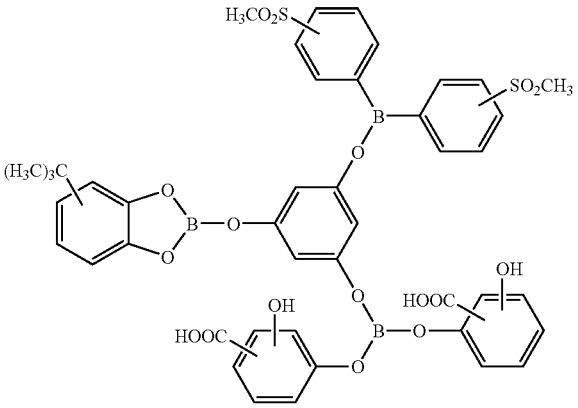
3Z-28
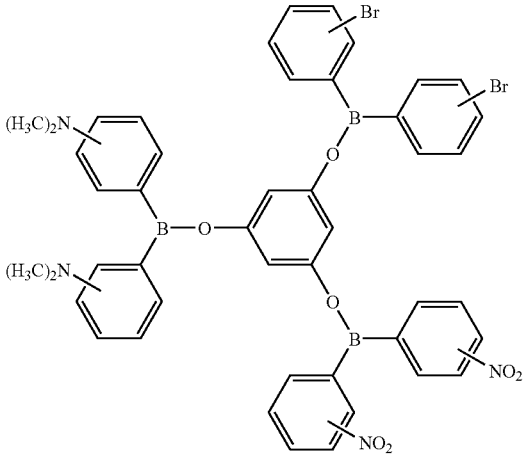
3Z-29
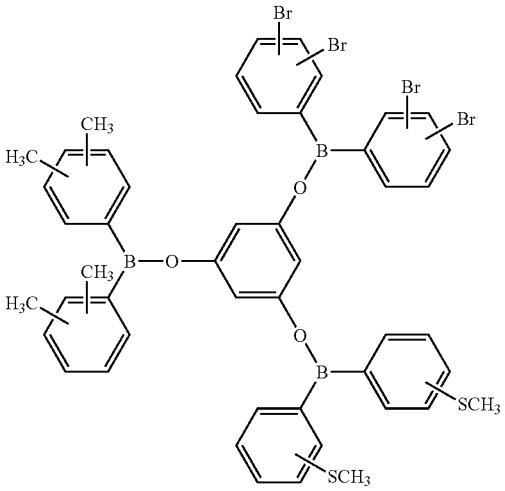
-continued
3Z-30
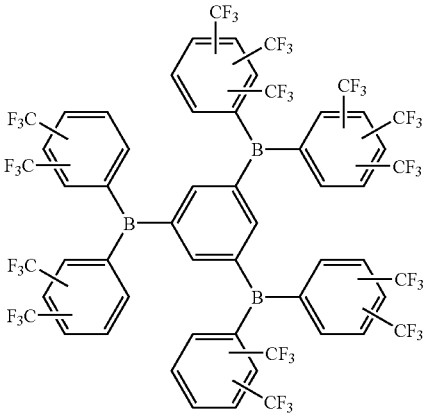
3Z-31
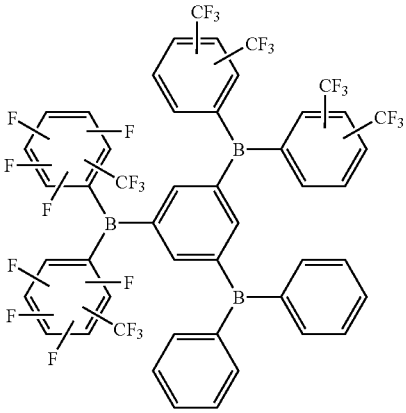
4Z-1
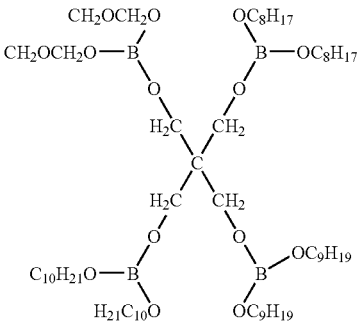
4Z-3
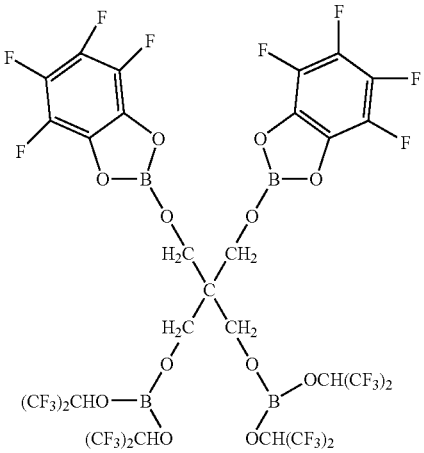

-continued
4Z-2
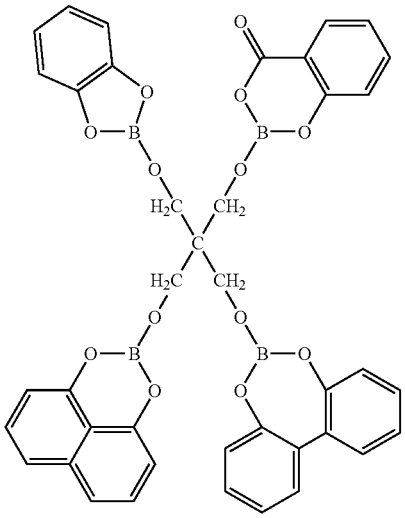
4Z-4
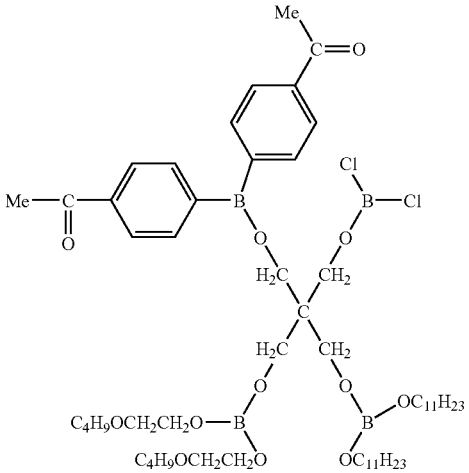
4Z-5
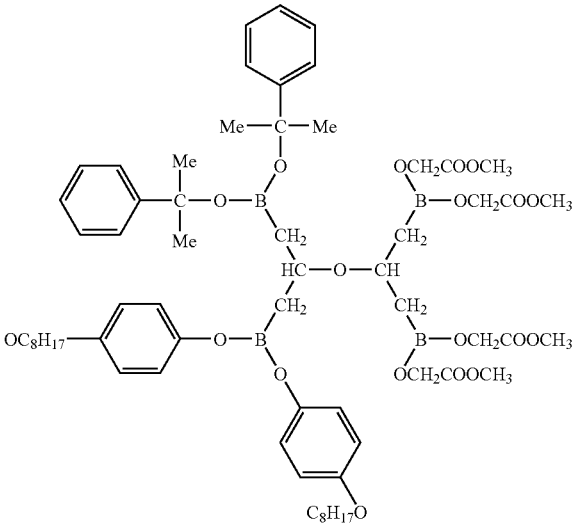
-continued
4Z-6
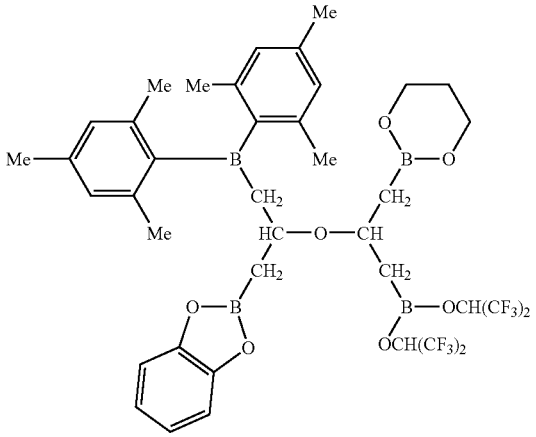
5Z-1
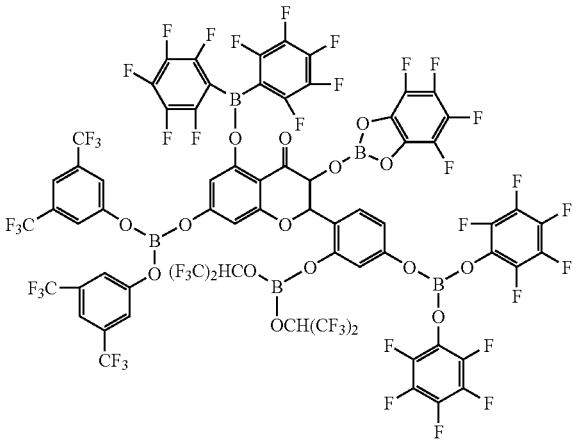
6Z-1
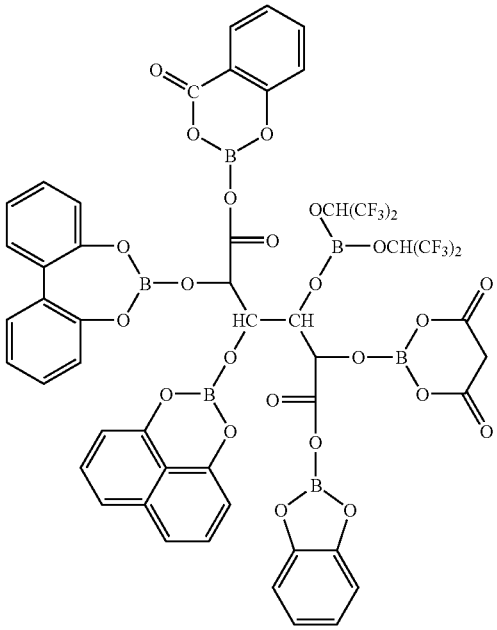

2. Polymeric Electrolyte

Examples of the polymeric compound used as the polymeric electrolyte of the invention include a polyalkylene, a polyether, a polyester, a polyamine, a polyimide, a polyurethane, a polysulfide, a polyphosphazene, a polysiloxane, a polyalkylene oxide, a polyvinylidene fluoride, polyhexafluoropropylene, polyacrylonitrile, polymethyl methacrylate, derivatives thereof, copolymers thereof and crosslinked products thereof. They are used either singly or in combination.

Of these, a polymeric compound made of a polyalkylene oxide, and/or derivatives thereof, and/or crosslinked products thereof is preferable. For example, a polymer or a copolymer of compound (A) represented by the following formula (5) and/or compound (B) represented by the following formula (6) can be used.

(5)

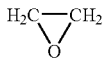

compound (A)

(6)

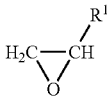

compound (B)

In formula (6), $R^1$ represents a methyl group, an ethyl group, a propyl group, a butyl group or a group represented by the following formula (7).

$$[-CH_2-[-CH_2CH_2O-]_r-Ra]\ -CH_2O-[-CH_2CH_2O-]_r- \quad \text{formula (7)}$$

*Ra*

In formula (7), r represents 0 or an integer of 1 or more, and Ra represents a methyl group, an ethyl group, a propyl group or a butyl group.

The electrolytic salt is preferably a metallic salt, more preferably a lithium salt. Examples thereof include $LiBF_4$, $LiPF_6$, $LiClO_4$, $LiAsF_6$, $LiCF_3SO_3$, $LiN(CF_3SO_2)_2$, $LiN(C_2F_5SO_2)_2$, $LiC(CF_3SO_2)_3$, LiCl, LiF, LiBr, LiI, derivatives thereof and like. These lithium salts may be used either singly or in combination.

The concentration of these electrolytic salts is usually 0.01 mol/kg to 10 mols/kg, preferably 0.2 mol/kg to 6 mols/kg.

The nonaqueous solvent is preferably an aprotic solvent. Examples thereof include carbonates, lactones, ethers, sulfolanes and dioxolanes. These aprotic solvents may be used either singly or in combination.

The polymeric compound to aprotic solvent mixing ratio is 1/99 to 99/1, preferably 5/95 to 95/5, more preferably 10/90 to 90/10 in terms of a weight ratio.

Further, a molar ratio of the compound having boron atoms in the structure to the electrolytic salt is preferably 0.1:100 to 300:100, more preferably 1:100 to 200:100, further preferably 50:100 to 100:100.

3. Nonaqueous Electrolyte

Examples of the electrolytic salt and the nonaqueous solvent used in the nonaqueous electrolyte of the invention are the same as those listed on the foregoing polymeric electrolyte. Further, the concentration of the electrolytic salt and the molar ratio of the boron atom-containing compound to the electrolytic salt may be in the same ranges as mentioned on the foregoing polymeric electrolyte.

4. Electric Devices

The polymeric electrolyte of the invention can be applied to various electric devices, and examples thereof include cells, capacitors and the like. Typical of these are cells which are obtained by linking a positive electrode and a negative electrode through any of the foregoing polymeric electrolytes or through any of the foregoing nonaqueous electrolytes and a separator.

In the positive electrode herein, a double metal oxide capable of occluding and releasing lithium ions is used. Examples thereof include cobalt lithium oxide, nickel lithium oxide, manganese lithium oxide, vanadium pentoxide and the like.

Further, in the negative electrode, a lithium metal, a lithium alloy or a substance capable of reversibly occluding and releasing lithium ions is used. Examples of such a substance include carbon and the like Moreover, as the separator, a porous film, a nonwoven fabric, a woven fabric or the like which can permeate lithium ions is used. Examples of the material thereof include olefinic polymers such as polyethylene, polypropylene and the like, fluoropolymers, cellulose-based polymers, glass fibers and the like.

5. EXAMPLES

The invention is illustrated more specifically below by referring to Examples. However, the invention is not limited to these Examples.

(1) Examples and Comparative Examples on a Polymeric Electrolyte

[Production of Monomers]

Monomer A

Potassium hydroxide (0.01 mol) was added to 1 mol of ethylene glycol monobutyl ether as a starting material, and a vessel was purged with nitrogen while stirring the mixture. Subsequently, the pressure inside the vessel was reduced using a vacuum pump. The temperature was then raised to 120° C., and the reaction was conducted using 1 mol of ethylene oxide as a monomer. After the completion of the reaction, the reaction mixture was cooled until the temperature inside the vessel reached room temperature. A methanol solution of 1.1 mols of sodium methylate was added, and the temperature was slowly raised to 50° C. while reducing the pressure. After methanol was completely removed, 1.2 mols of epichlorohydrin was added, and the mixturewas reacted for 4 hours. Afterthecompletion of the reaction, adsorption treatment was conducted. After dehydration under reduced pressure, the residue was filtered to obtain a desired product.

Monomer B

A desired product was obtained in the same manner as monomer A except that ethylene glycol monomethyl ether was used as a starting material and 9 mols of ethylene oxide was used as a monomer.

Monomer C

A desired product was obtained in the same manner as monomer A except that ethylene glycol monopropyl ether was used as a starting material and 2 mols of ethylene oxide was used as a monomer.

Monomer D

A desired product was obtained in the same manner as monomer A except that ethylene glycol monoethly ether was used as a starting material and 49 mols of ethylene oxide was used as a monomer.

Monomer E

A desired product was obtained in the same manner as monomer A except that ethylene glycol monomethyl ether was used as a starting material and 1 mol of ethylene oxide was used as a monomer.

[Production of Polymeric Compound Precursors B-1 to B-10]

Polymeric Compound Precursor B-1

Potassium hydroxide (0.01 mol) was added to 0.5 mol of ethylene glycol as a starting material, and a vessel was purges withnitrogenwhilestirringthemixture. Thepressureinside the vessel was reduced using a vacuum pump. The temperature was then raised to 120° C., and the reaction was conducted using 38,000 mols of ethylene oxide as a monomer. After the completion of the reaction, the reaction mixture was cooled until the temperature inside the vessel reached room temperature. A methanol solution of 1.1 mols of sodium methylate was added, and the temperature was slowly raised to 50° C. while reducing the pressure. After methanol was completely removed, the residue was allowed to cool. One kilogram of toluene was added, and 1 mol of acrylic acid chloride was added. The mixture was reacted for 4 hours. After acid and alkali adsorption treatment was conducted, the residue was filtered, and toluene was removed under reduced pressure to obtain a desired product.

Polymeric Compound Precursor B-2

A desired product was obtained in the same manner as polymeric compound precursor B-1 except that 0.33 mol of glycerin was used as a starting material, 28,000 mols of propylene oxide was used as a monomer and methacrylic acid chloride was used instead of acrylic acid chloride.

Polymeric Compound Precursor B-3

A desired product was obtained in the same manner as polymeric compound precursor B-1 except that 0.25 mol of diglycerin was used as a starting material, 150 mols of ethylene oxide and 600 mols of 1,2-epoxyhexane were used as monomers, allyl chloride was used instead of acrylic acid chloride.

Polymeric Compound Precursor B-4

A desired product was obtained in the same manner as polymeric compound precursor B-1 except that 0.5 mol of ethylene glycol was used as a starting material, 2 mols of ethylene oxide and 1 mol of butylene oxide were used as monomers and vinyl chloride was used instead of acrylic acid chloride.

Polymeric Compound Precursor B-5

A desired product was obtained in the same manner as polymeric compound precursor B-1 except that 0.33 mol of glycerin was used as a starting material and 150 mols of ethylene oxide and 29 mols of 1,2-epoxypentane were used as monomers.

Polymeric Compound Precursor B-6

A desired product was obtained in the same manner as polymeric compound precursor B-1 except that 600 mols of monomer A was used as a monomer.

Polymeric Compound Precursor B-7

A desired product was obtained in the same manner as polymeric compound precursor B-2 except that 50 mols of ethylene oxide and 15 mols of monomer B were used as monomers.

Polymeric Compound Precursor B-8

A desired product was obtained in the same manner as polymeric compound precursor B-3 except that 1 mol of ethylene oxide and 1 mol of monomer C were used as monomers.

Polymeric Compound Precursor B-9

A desired product was obtained in the same manner as polymeric compound precursor B-4 except that 1,600 mols of ethylene oxide and 400 mols of monomer D were used as monomers.

Polymeric Compound Precursor B-10

A desired product was obtained in the same manner as polymeric compound precursor B-5 except that 126 mols of ethylene oxide and 24 mols of monomer E were used as monomers.

The structures of polymeric compound precursors B-1 to B-10 obtained in the foregoing production examples are as shown in the following tables and chemical formulas.

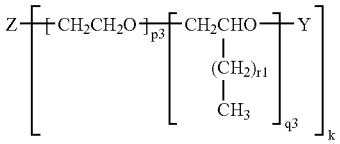

Z is an active hydrogen residue.

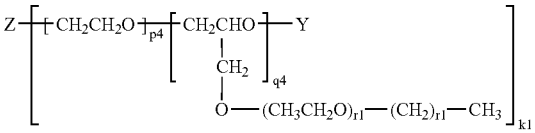

Z is an active hydrogen residue.

| Compound | p4 | q4 | r1 | t | Y | k |
|---|---|---|---|---|---|---|
| B-6 | 0 | 600 | 2 | 3 | acryloyl group | 2 |
| B-7 | 50 | 15 | 10 | 0 | methacryloyl group | 3 |
| B-8 | 1 | 1 | 3 | 2 | allyl group | 4 |
| B-9 | 1600 | 400 | 50 | 1 | vinyl group | 2 |
| B-10 | 126 | 24 | 2 | 0 | acryloyl group | 3 |

[ B-1

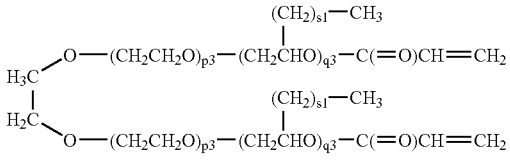

] B-1

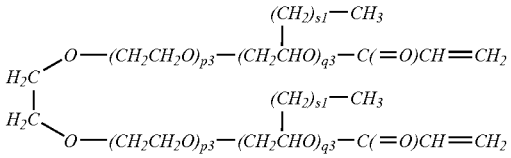

B-2

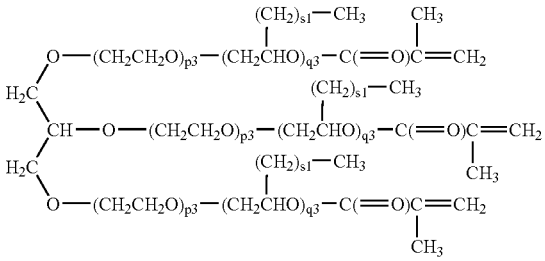

-continued

B-3

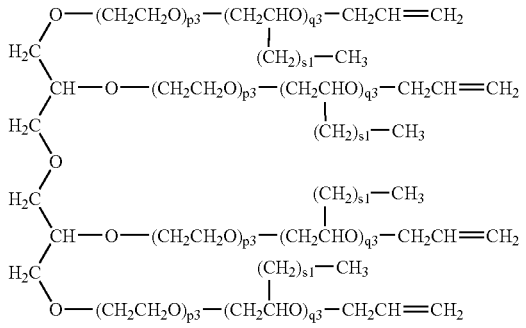

B-4

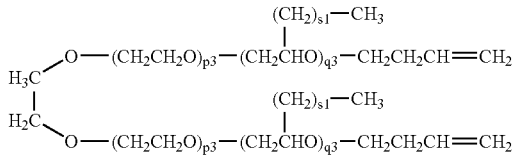

B-5

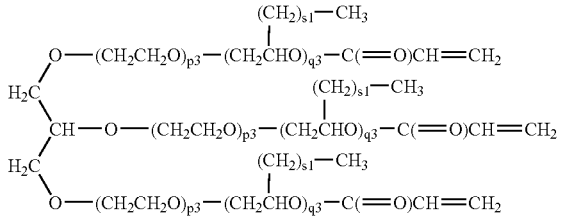

B-6

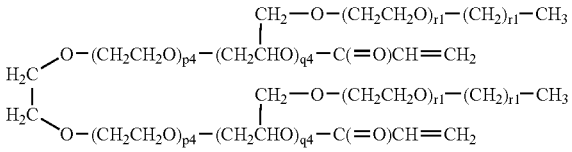

B-7

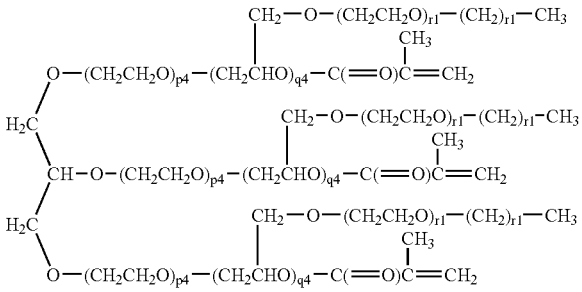

B-8

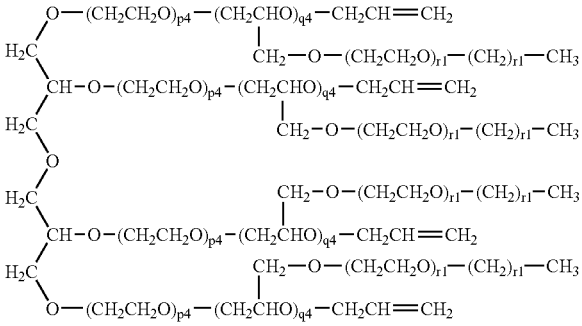

-continued

B-9

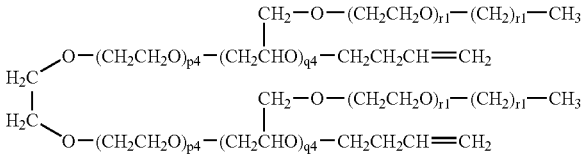

B-10

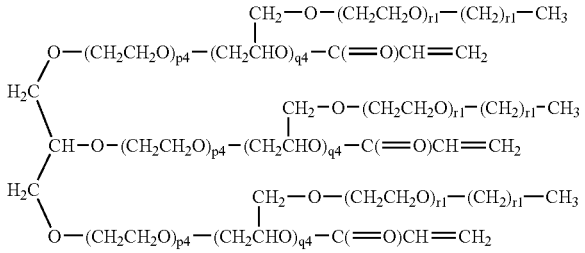

[Production of a Polymeric Electrolyte]

Example 1

The additive (1 mol/kg) represented by the formula 3Z-3, 1 mol/kg of $LiBF_4$, 1.2 g of γ-butyrolactone and a photopolymerization initiator were added to 1 g of polymeric compound precursor B-1. These were dissolved at 40° C., and poured between glass plates. The mixture was then irradiated with ultraviolet rays in an argon atmosphere to obtain a polymeric electrolyte having a thickness of 500 μm.

Examples 2 to 12

Polymeric electrolytes were obtained in the same manner as in Example 1 except that types and amounts of polymeric compound precursors, additives, salts and aprotic solvents shown in Table 1were used.

Comparative Examples 1 to 3

Polymeric electrolytes were obtained in the same manner as in Example 1 except that types and amounts of polymeric compound precursors, additives, salts and aprotic solvents shown in Table 1 were used.

[Measurement of a Lithium ion Transport Rate]

Each of the polymeric electrolytes obtained in the foregoing Examples and Comparative Examples was cut in a circle having a diameter of 13 mm, and this was held between lithium metal electrodes having the same diameter. A lithium ion transport rate was measured by a DC polarization method.

The results are also shown in Table 1.

TABLE 1

| | Additive and its concentration (mol/kg) | | Polymeric compound precursor | | Salt and its concentration (mol/kg) | | Aprotic solvent | Lithium ion transport rate |
|---|---|---|---|---|---|---|---|---|
| Example | | | | | | | | |
| 1 | 3z-3 | 1 | B-1 | 1 | $LiBF_4$ | 1 | GBL 1.2 g | 0.84 |
| 2 | 3z-13 | 0.03 | B-2 | 1 | $LiPF_6$ | 0.01 | — | 0.75 |
| 3 | 4z-3 | 0.05 | B-3 | 1 | $LiClO_4$ | 0.1 | — | 0.84 |
| 4 | 5Z-1 | 0.01 | B-4 | 1 | $LiAsF_6$ | 10 | — | 0.76 |
| 5 | 6Z-1 | 0.005 | B-5 | 1 | $LiCF_3SO_3$ | 5 | — | 0.83 |
| 6 | 3Z-3 | 0.05 | B-6 | 1 | $LiN(CF_3SO_2)_2$ | 0.05 | — | 0.81 |
| 7 | 3Z-13 | 2 | B-7 | 1 | $LiN(C_2F_5SO_2)_2$ | 2 | — | 0.79 |
| 8 | 4z-3 | 8 | B-8 | 1 | $LiC(CF_3SO_2)_3$ | 8 | — | 0.79 |
| 9 | 5Z-1 | 0.005 | B-9 | 1 | LiCl | 0.5 | — | 0.77 |
| 10 | 6Z-1 | 0.03 | B-10 | 1 | LiF | 3 | EC 9.5 g, DO 9.5 g | 0.82 |
| 11 | 3Z-3 | 0.3 | B-5 | 1 | LiBr | 0.3 | EC 0.3 g, SL 0.3 g | 0.80 |
| 12 | 3Z-13 | 6 | B-10 | 1 | LiI | 6 | EC 1 g, DME 2 g | 0.82 |
| Comparative Example | | | | | | | | |
| 1 | 4Z-3 | 0.001 | B-5 | 1 | $LiN(CF_3SO_2)_2$ | 0.001 | — | 0.61 |
| 2 | 5Z-1 | 15 | B-10 | 1 | LiCl | 15 | — | unmeasureable |
| 3 | not added | | B-5 | 1 | $LiBF_4$ | 1 | — | 0.12 |

*EC: ethylene carbonate,
GBL: γ-butyrolactone,
DO: 1,3-dioxolane,
DME: 1,2-dimethoxyethane,
SL: sulfolane (2) Examples and Comparative Examples on a Nonaqueous Electrolyte

[Production of a Nonaqueous Electrolyte]

Example 1

The additive (1 mol/kg) represented by the formula 3Z-3 and 1 mol/kg of $LiBF_4$ were added to 1.2 g of γ-butyrolactone, and there were dissolved in a glove box at 40° C. to obtain a nonaqueous electrolyte.

Examples 2 to 12

Nonaqueous electrolytes were obtained in the same manner as in Example 1 except that types and amounts of additives, salts and aprotic solvents shown in Table 2 were used.

Comparative Examples 1 to 3

Nonaqueous electrolytes were obtained in the same manner as in Example 1 except that types and amount of additives, salts and aprotic solvents shown in Table 2 were used.

[Measurement of a Lithium ion Transport Rate]

A polypropylene porous separator having a diameter of 13 mm was dipped with each of the nonaqueous electrolytes obtained in the foregoing Examples and Comparative Examples. After the dipping was conducted satisfactorily, the resulting separator was held between lithium metal electrodes having the same diameter. A lithium ion transport rate was measured by a DC polarization method. The results are also shown in Table 2.

TABLE 2

| | Additive and its concentration (mol/kg) | | Salt and its concentration (mol/kg) | | Aprotic solvent | Lithium ion transport rate |
|---|---|---|---|---|---|---|
| Example | | | | | | |
| 1 | 3z-3 | 1 | $LiBF_4$ | 1 | GBL | 0.77 |
| 2 | 3z-13 | 0.03 | $LiPF_6$ | 0.01 | PC | 0.66 |
| 3 | 4z-3 | 0.05 | $LiClO_4$ | 0.1 | PC:DEC = 1:1 | 0.70 |
| 4 | 5Z-1 | 0.01 | $LiAsF_6$ | 10 | PC:DME = 1:2 | 0.67 |
| 5 | 6Z-1 | 0.005 | $LiCF_3SO_3$ | 5 | EC:GBL = 3:7 | 0.76 |
| 6 | 3Z-3 | 0.05 | $LiN(CF_3SO_2)_2$ | 0.05 | EC:EMC = 2:1 | 0.73 |
| 7 | 3Z-13 | 2 | $LiN(C_2F_5SO_2)_2$ | 2 | EC:DEC:DMC = 1:1:1 | 0.71 |
| 8 | 4z-3 | 8 | $LiC(CF_3SO_2)_3$ | 8 | PC:DEC = 1:1 | 0.73 |
| 9 | 5Z-1 | 0.005 | LiCl | 0.5 | PC:DME = 1:2 | 0.71 |
| 10 | 6Z-1 | 0.03 | LiF | 3 | EC:DO = 1:1 | 0.74 |
| 11 | 3Z-3 | 0.3 | LiBr | 0.3 | EC:SL = 1:2 | 0.72 |
| 12 | 3Z-13 | 6 | LiI | 6 | EC:DME = 1:2 | 0.74 |

TABLE 2-continued

| Comparative Example | Additive and its concentration (mol/kg) | | Salt and its concentration (mol/kg) | | Aprotic solvent | Lithium ion transport rate |
|---|---|---|---|---|---|---|
| 1 | 4Z-3 | 0.001 | $LiN(CF_3SO_2)_2$ | 0.001 | EC:GBL = 3:7 | 0.50 |
| 2 | 5Z-1 | 15 | LiCl | 15 | EC:EMC = 2:1 | unmeasureable |
| 3 | not added | | $LiBF_4$ | 1 | EC:DEC:DMC = 1:1:1 | 0.30 |

*EC ethylene carbonate,
GBL γ-butyrolactone,
DO 1,3-dioxolane,
DME 1,2-dimethoxyethane,
SL sulfolane,
PC propylene carbonate,
DEC diethyl carbonate,
EMC ethyl methyl carbonate,
DMC dimethyl carbonate

INDUSTRIAL APPLICABILITY

The polymeric electrolyte and the nonaqueous electrolyte of the invention can accelerate dissociation of an electrolytic salt upon using a compound having plural trivalent boron atoms in the structure, a Lewis acid, as an additive and consequently improve a transport rate of charge carrier ions. Besides, since an effect of addition per unit weight is great, the transport rate can be improved much, and an effective concentration region of the additive is also wide.

Accordingly, the use of them can provide cells having a higher voltage and a higher capacity than usual ones. Although the usage of cells is not limited, they are preferably used in portable electric appliances such as a video, a camera, a personal computer, a cellular phone and the like.

What is claimed is:

1. A polymeric electrolyte comprising an electrolytic salt, a polymeric compound forming a complex with the electrolytic salt and a compound having boron atoms which is one or more selected from the group consisting of compounds represented by the following general formulas (1) to (4)

general formula (1)

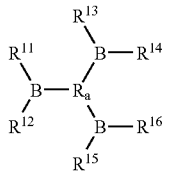

general formula (2)

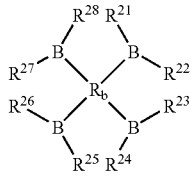

general formula (3)

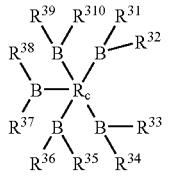

-continued general formula (4)

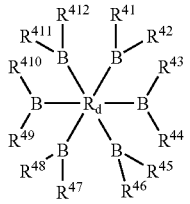

wherein $R^{11}$, $R^{12}$, $R^{13}$, $R^{14}$, $R^{15}$ and $R^{16}$ in formula (1), $R^{21}$, $R^{22}$, $R^{23}$, $R^{24}$, $R^{25}$, $R^{26}$, $R^{27}$ and $R^{28}$ in formula (2), $R^{31}$, $R^{32}$, $R^{33}$, $R^{34}$, $R^{35}$, $R^{36}$, $R^{37}$, $R^{38}$, $R^{39}$ and $R^{310}$ in formula (3), and $R^{41}$, $R^{42}$, $R^{43}$, $R^{44}$, $R^{45}$, $R^{46}$, $R^{47}$, $R^{48}$, $R^{49}$, $R^{410}$, $R^{411}$ and $R^{412}$ in formula (4), which may be the same or different, each represent a hydrogen atom, a halogen atom or a monovalent group, or are bound to each other to form a ring, $R_a$ in formula (1) represents a group having a site capable of being bound to at least 3 boron atoms which are the same or different, $R_b$ in formula (2) represents a group having a site capable of being bound to at least 4 boron atoms which are the same or different, $R_c$ in formula (3) represents a group having a site capable of being bound to at least 5 boron atoms which are the same or different, and $R_d$ in formula (4) represents a group having a site capable of being bound to at least 6 boron atoms which are the same or different.

2. The polymeric electrolyte according to claim 1, wherein $R^{11}$, $R^{12}$, $R^{13}$, $R^{14}$, $R^{15}$, $R^{16}$, $R^{21}$, $R^{22}$, $R^{23}$, $R^{24}$, $R^{25}$, $R^{26}$, $R^{27}$, $R^{28}$, $R^{31}$, $R^{32}$, $R^{33}$, $R^{34}$, $R^{35}$, $R^{36}$, $R^{37}$, $R^{38}$, $R^{39}$, $R^{310}$, $R^{41}$, $R^{42}$, $R^{43}$, $R^{44}$, $R^{45}$, $R^{46}$, $R^{47}$, $R^{48}$, $R^{49}$, $R^{410}$, $R^{411}$ and $R^{412}$ are one or more of an alkyl group, an aryl group and flourine-substituted derivatives thereof.

3. The polymeric electrolyte according to claim 1 or 2, wherein the polymeric compound is one or more selected from the group consisting of a polyalkylene, a polyether, a polyester, a polyamine, a polyimide, a polyurethane, a polysulfide, a polyphosphazene, a polysiloxane, derivatives thereof, copolymers thereof and crosslinked products thereof.

4. The polymeric electrolyte according to claim 1 or 2, wherein the polymeric compound is one or more selected from the group consisting of a polyalkylene oxide, polyvinylidene fluoride, polyhexafluoropropylene, polyacrylonitrile, polymethyl methacrylate, derivatives thereof, copolymers thereof and crosslinked products thereof.

5. The polymeric electrolyte according to claim 1 or 2, wherein the electrolytic salt is a metallic salt.

6. The polymeric electrolyte according to claim 5, wherein the metallic salt is a lithium salt.

7. The polymeric electrolyte according to claim 6, wherein the lithium salt is one or more selected from the group consisting of $LiBF_4$, $LiPF_6$, $LiClO_4$, $LiAsF_6$, $LiCF_3SO_3$, $LiN(CF_3SO_2)_2$, $LiN(C_2F_5SO_2)_2$, $LiC(CF_3SO_2)_3$, LiCl, LiF, LiBr, LiI, derivatives thereof and like.

8. The polymeric electrolyte according to claim 1 or 2, further comprising a nonaqueous solvent.

9. The polymeric electrolyte according to claim 8, wherein the nonaqueous solvent is an aprotic solvent.

10. The polymeric electrolyte according to claim 9, wherein the aprotic solvent is one or more selected from the group consisting of carbonates, lactones, ethers, sulfolanes and dioxolanes.

11. The polymeric electrolyte according to claim 1 or 2, wherien the molar ratio of the compound having boron atoms to the electrolytic salt is 0.1:100 to 300:100.

12. An electric device comprising the polymeric electrolyte according to claim 1 or 2.

13. A cell comprising a positive electrode, a negative electrode and the polymeric electrolyte according to claim 1 or 2, said electrodes being linked through said electrolyte.

14. The cell according to claim 13, wherein the positive electrode is made of a double metal oxide capable of occluding and releasing lithium ions, and the negative electrode is made of a lithium metal, a lithium alloy or a compound capable of reversibly occluding and releasing lithium ions.

* * * * *